US006357167B1

(12) United States Patent
Bradford

(10) Patent No.: US 6,357,167 B1
(45) Date of Patent: Mar. 19, 2002

(54) FISHING LURE APPARATUS AND METHOD

(76) Inventor: Richard N. Bradford, 578 North St., Longwood, FL (US) 32750

( * ) Notice: Subject to any disclaimer, the term of this patent is extended or adjusted under 35 U.S.C. 154(b) by 0 days.

(21) Appl. No.: 09/567,393

(22) Filed: May 9, 2000

(51) Int. Cl.[7] ............................ A01K 85/00; A01K 85/01
(52) U.S. Cl. .................... 43/42.09; 43/42.28; 43/42.05; 43/42.06; 43/42.31
(58) Field of Search ................. 43/42.05, 42.06, 43/42.08, 42.09, 42.24, 42.28, 42.31; D22/128

(56) References Cited

U.S. PATENT DOCUMENTS

| | | | | |
|---|---|---|---|---|
| 1,454,820 A | * | 5/1923 | Readle | 43/42.05 |
| 2,617,226 A | * | 11/1952 | Yoshii | 43/42.05 |
| 2,625,767 A | * | 1/1953 | Pokras | 43/42.05 |
| 2,686,382 A | * | 8/1954 | Fisher | 43/42.28 |
| 3,269,050 A | * | 8/1966 | Garwood | D22/128 |
| 3,740,889 A | * | 6/1973 | Scott | 43/42.09 |
| 3,848,353 A | * | 11/1974 | McClellan | 43/42.31 |
| 3,947,989 A | * | 4/1976 | Bart | 43/42.09 |
| 4,033,063 A | * | 7/1977 | Mize | 43/42.05 |
| 4,054,004 A | * | 10/1977 | Schott | 43/42.09 |
| 4,215,506 A | * | 8/1980 | LeBoeuf | 43/42.05 |
| 4,520,588 A | * | 6/1985 | Hindermyer | 43/42.06 |
| 4,619,067 A | * | 10/1986 | West | 43/42.09 |
| 4,630,389 A | * | 12/1986 | Higgins | 43/42.22 |
| 4,777,757 A | * | 10/1988 | de Marees van Swinderen | 43/42.05 |
| 4,831,768 A | * | 5/1989 | Sorace | 43/42.09 |
| 4,831,770 A | | 5/1989 | Dworski | 43/42.24 |
| 5,018,297 A | * | 5/1991 | Kennedy, Jr. | 43/42.28 |
| 5,097,620 A | * | 3/1992 | Nietupski | 43/42.06 |
| 5,113,607 A | * | 5/1992 | Pate | 43/42.28 |
| 5,167,089 A | | 12/1992 | Schriefer | 43/42.28 |
| 5,172,510 A | | 12/1992 | Lovell, Jr. | 43/42.06 |
| 5,207,016 A | * | 5/1993 | Pate | 43/42.28 |
| 5,259,151 A | * | 11/1993 | Wicht | 43/42.31 |
| 5,261,181 A | * | 11/1993 | Melton | 43/42.06 |
| 5,335,441 A | * | 8/1994 | Blackwell | 43/42.36 |
| 5,361,531 A | * | 11/1994 | Rodrigues | 43/42.09 |
| 5,369,906 A | * | 12/1994 | Anterni | 43/42.09 |
| 5,491,927 A | * | 2/1996 | Ortiz | 43/42.28 |

FOREIGN PATENT DOCUMENTS

| | | |
|---|---|---|
| EP | 474959 A1 * | 3/1992 |
| JP | 11-313578 B1 * | 11/1999 |
| JP | 11-332418 B1 * | 12/1999 |

* cited by examiner

*Primary Examiner*—Darren W. Ark
(74) *Attorney, Agent, or Firm*—William M. Hobby, III

(57) ABSTRACT

A fishing lure apparatus having a changeable skirt has a head having a bore therethrough for passage of a fishing line in a chamber formed therein. An attaching member is attached to the rear of the head. A lure skirt has a slotted skirt sleeve at one end thereof with a plurality of stringers extending therefrom which attaches to a slotted skirt support ring using a slotted clamp. A locking member having a bore therethrough slides on the fishing line and attaches to the head attaching member through the slotted skirt sleeve, slotted skirt supporting ring, and slotted clamp for attaching the skirt to the fishing lure. By loosening the locking member, the skirt attached to the skirt supporting ring with the slotted clamp can be slid off the leader and removed from the lure head. The skirt and other members are removed by sliding the fishing line through the slot in the skirt sleeve and then sliding a replacement skirt attached to a skirt supporting ring with a slotted clamp over the fishing line and reattaching the locking member to the attaching member on the head of the lure. The lure also provides for a second slotted sleeve skirt ring and clamp for removably attaching a second skirt to the fishing lure. The method provides for selecting the fishing lure and changing the skirt thereon while the lure is attached to the fishing line.

8 Claims, 2 Drawing Sheets

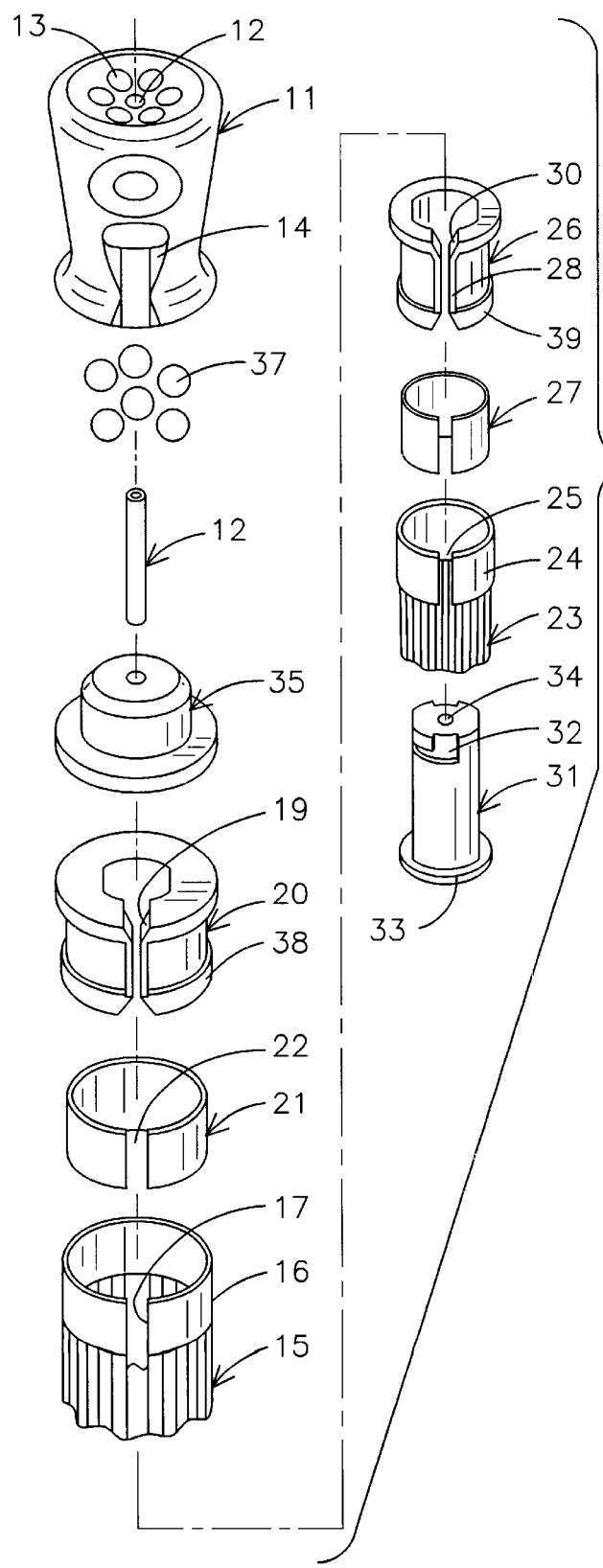
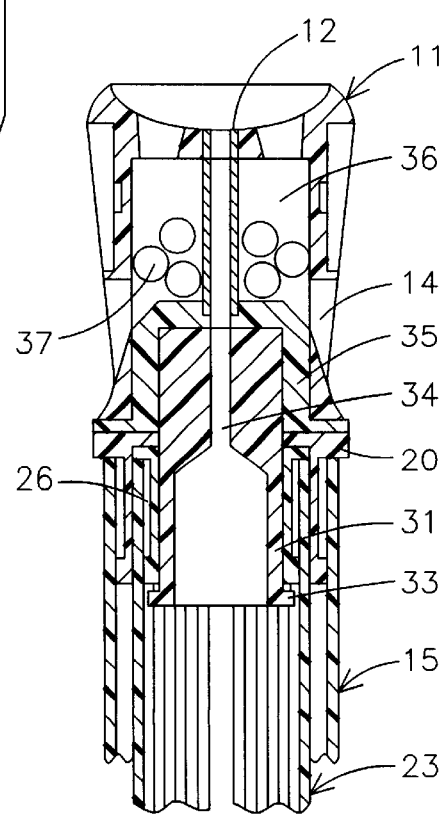
FIG. 3
FIG. 4

FISHING LURE APPARATUS AND METHOD

BACKGROUND OF THE INVENTION

The present invention relates to fishing lures and especially to a fishing lure having a skirt which can be changed while the lure is attached to a fishing line.

Many lures, particularly those that are used by commercial and recreational trollers, are constructed so that they can be slidably mounted on a leader which has a hook at one end and which is connected at the other end to a fishing line. Snaps and swivels are generally used to connect the hook to the leader. The swivels serve as stops to prevent the lures from sliding off the leaders and to prevent the leaders from being twisted. Drag applied to the hook by a hooked fish therefore is transferred directly from the hook to the line so that the lure does not take the weight of the fish. Due to changes in fishing conditions, it is usually desirable to change the lures in order to provide for a different type or color of skirt and, if the skirt becomes worn or frayed, it is also desirable to provide a new skirt.

In order to change the skirt on a prior art lure, it has generally been necessary to cut the leader just above the hook so that the lure can be removed and replaced with another lure of a different color or shape and the hook then resecured on the leader. This takes considerable time and shortens the leader so that the leader has to be replaced frequently.

The present invention allows the changing of one or two skirts on a lure connected to a leader of this type without cutting the leader or the fishing line and replacing the lure. The changing of the skirt can be accomplished rapidly to obviate lost time when on a fishing trip. It has been suggested in the prior art to have fishing lures with changeable skirts secured to the body of the fishing lure. Generally, these prior art changeable skirt lures merely change the skirt which is attached directly to the head of the lure and does not have the fishing leader passing through the lure to connect to the hook. It has also however been suggested to change the skirts or other components of fishing lures of the type having the leader passing directly through and connecting to the hook.

Prior art fishing lures which have changeable skirts can be seen in the West U.S. Pat. No. 4,619,067, for a fishing lure assembly employing a body and one or more replaceable skirts secured to the body by a threaded connection therebetween and in the Scott U.S. Pat. No. 3,740,889 for a fishing lure which releasably clamps a skirt member to the body member so that the skirt member can be removed and replaced without disconnecting the body member from the fishing line. The Pokras U.S. Pat. No. 2,625,767 is for a fishing lure in which the streamers are attached with a resilient sleeve for replacement. This patent allows for the replacement of the skirt without removing the hook or cutting off a portion of the leader by utilizing a head that splits into two parts. The Pate U.S. Pat. No. 5,113,607 is for a segmental fishing lure and method which permits replacement of the shell and skirt assemblies without disturbing the leader. The Ortiz U.S. Pat. No. 5,491,927 is for a fishing lure with interchangeable skirt. The Pate U.S. Pat. No. 5,207,016 is for a two-piece fishing lure while the Rodrigues U.S. Pat. No. 5,361,531 is for a fishing lure having replaceable, decorative and fish attracting skirts to provide a wide selection of lures with a minimum of parts. The Sorace U.S. Pat. No. 4,831,768 is for a fishing lure having a head and tail wherein the tail may be changed without affecting the other portions of the lure.

In contrast to these prior art fishing lures, the present fishing lure allows for the rapid change of the skirt of the fishing lure without removing the hook from the leader or without removing the fishing lure from the leader. It also allows for changing two skirts on the same lure, one mounted inside the other, which are both changeable while the lure is mounted to a leader. It also provides for a fishing lure having a changeable skirt which has a noise making head for generating noise by the flow of water through the head of the lure.

SUMMARY OF THE INVENTION

A fishing lure apparatus having a changeable skirt has a head having a bore therethrough for passage of a fishing line in a chamber formed therein. An attaching member is attached to the rear of the head. A lure skirt has a slotted skirt sleeve at one end thereof with a plurality of stringers extending therefrom which attaches to a slotted skirt support ring using a slotted clamp. A locking member having a bore therethrough slides on the fishing line and attaches to the head attaching member through the slotted skirt-sleeve, slotted skirt supporting ring, and slotted clamp for attaching the skirt to the fishing lure. By loosening the locking member, the skirt attached to the skirt supporting ring with the slotted clamp can be slid off the leader and removed from the lure head. The skirt and other members are removed by sliding the fishing line through the slot in the skirt sleeve and then sliding a replacement skirt attached to a skirt supporting ring with a slotted clamp over the fishing line and reattaching the locking member to the attaching member on the head of the lure. The lure also provides for a second slotted sleeve skirt ring and clamp for removably attaching a second skirt to the fishing lure. The method provides for selecting the fishing lure and changing the skirt thereon while the lure is attached to the fishing line.

BRIEF DESCRIPTION OF THE DRAWINGS

Other objects, features, and advantages of the present invention will be apparent from the written description and the drawings in which:

FIG. 3 is a perspective exploded view of the fishing lure of FIG. 2; and

FIG. 4 is a sectional view taken through the head of the fishing lure of FIGS. 2 and 3.

DESCRIPTION OF THE PREFERRED EMBODIMENT

Figures 1, 2:
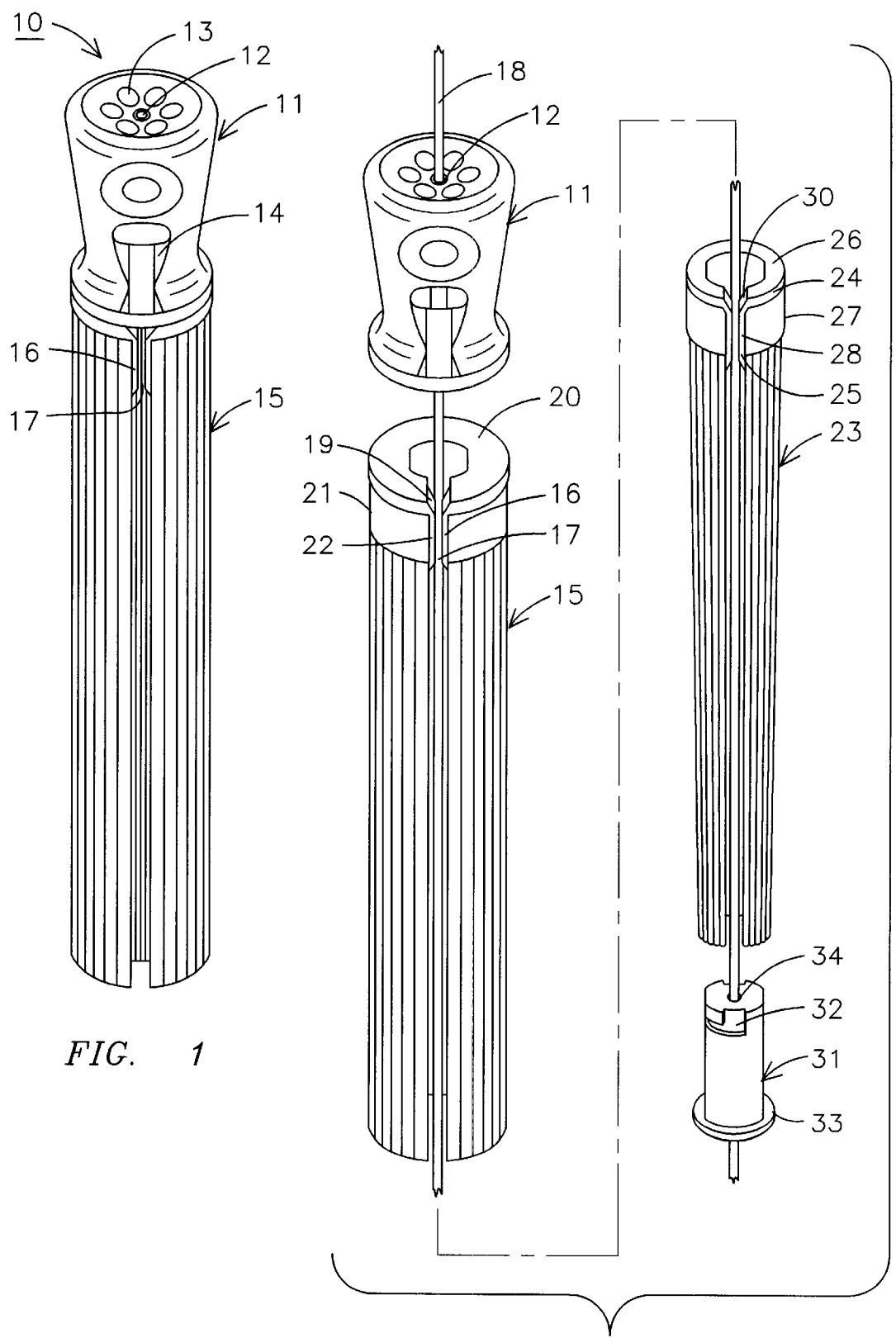
FIG. 1 is a perspective view of a fishing lure in accordance with the present invention.
FIG. 2 is an exploded perspective view of the fishing lure of FIG. 1 having two skirts attached to a common head.

Referring to FIG. 1 of the drawings, a fishing lure 10 is illustrated having a fishing lure head 11 having a sleeve 12 mounted through the head for the passage of a fishing line or leader and a plurality of openings 13 opening into a chamber located within the head 11. An exit opening 14 allows for the passage of water through the apertures 13 and out the opening 14 passing through the chamber in the head 11. A skirt 15 is removably attached to the head 11 while the fishing lure 10 is attached to a fishing leader by passing the leader through the sleeve 12 and extending through the head where it is attached to a hook on the other side of the head within the streamers of the skirt 15. The skirt 15 can be seen having a sleeve 16 having a slot 17 therein adjacent the attachment to the head 11.

As shown in FIG. 2, the head 11 has the leader 18 passing through the sleeve 12 while the skirt attaching ring 20 is shown having the skirt sleeve 16 having the slot 17 attached thereto with a slotted clamp 21 having the slot 22 therein. The clamp 21 clamps over the slotted skirt supporting ring 20 after the fishing leader 18 has been passed therethrough. The fishing lure, as illustrated in FIG. 2, has a separate skirt 23 having a sleeve 24 at one end having a slot 25 therein and being held to a second skirt supporting ring 26 with a slotted clamp 27 having the slot 28 therethrough. The skirt supporting ring 26 also has the slot 30 therethrough. A locking member 31 has a bayonet type connection 32 formed on one end thereof and an annular flanged surface 33 on the other end thereof. The locking member 31 has a bore 34 passing therethrough for the leader 18 to pass through. The locking member 31 slides through the skirt supporting ring 26 for the skirt 23 and through the skirt supporting ring 20 for the skirt 15 and attaches to the fishing lure head 11 head attaching member 35, as seen in FIGS. 3 and 4. The bayonet connection on the locking member 31 advantageously allows the locking member 31 to be quickly locked to the attaching member 35 into the head 11 and to be quickly removed for sliding the locking member 31 on the leader 18 to allow the mounted skirts 15 and 23 to be slid back from the head and removed from the fishing lure by sliding the leader 18 through the slots through the slotted skirt sleeve and through the skirt support ring and the slotted clamps of both the smaller skirt 23 and larger skirt 15. Another skirt 15 or 23 can then be slid over the leader and locked to the head 11 with a locking member 31.

As seen in FIGS. 3 and 4, fishing lure head 11 having the apertures 13 opening into a chamber 36 has a plurality of noise making members 37 which are illustrated as spherical members which can be made of a metal or polymer or glass and which are vibrated by the water passing through the apertures 13 through the chamber 36 and out the opening 14 to the chamber. The members 37 are also used for mincing any air bubbles passing through the chamber. The sleeve 12 can be seen passing through the chamber 36 for passing the fishing line leader therethrough while the attaching member 35 is attached to the head to form a closed end to the chamber 36 and also to provide a bayonet attachment for the locking member 31 bayonet attaching groove 32. The locking member 31 can be passed through the small skirt 23 having the slotted skirt sleeve 24 having the slot 25 therein which mounted over the lip 39 of the skirt supporting ring 26 and clamped with the clamp 27 and also through the skirt 15, skirt sleeve 16 having the slotted opening 17 which has been clamped over the lip 38 of the skirt supporting ring 20 with the clamp 21 having the slot 22 therein. The skirt supporting ring 20 has the slot 19 passing therethrough. The locking member 31 can then be locked into the attaching member 35 which has been fixedly attached to the head 11.

The method of changing the skirt of the lure of FIGS. 1 through 4 includes selecting a fishing lure 10 having a head 11 having a sleeve 12 passing therethrough and a chamber 36 formed therein and having an attaching member 35 attached to the head 11 and a skirt 15 having a slotted skirt sleeve 16 at one end thereof and a plurality of stringers extending therefrom. The slotted skirt supporting ring 20 is shaped for attaching the skirt 15 thereto with a slotted clamp 21 to hold the skirt 15 thereto. A locking member 31 has a bore therethrough and a locking end for engaging the attaching member 35 for attaching the skirt ring 20 clamped with the clamp 21 thereto. The method includes disengaging the locking member 31 from the attaching member 35 and removing the slotted clamp 21 and the skirt ring and the skirt from the fishing line or leader by sliding the skirt from the leader. The method includes selecting a replacement skirt having a slotted skirt sleeve attached to a slotted skirt support ring with a slotted clamp and sliding the selected replacement sleeve over the fishing leader and connecting the locking member to the head attaching member to lock the replacement skirt to the lure.

It should be clear at this time that a fishing lure has been provided having a changeable skirt which can be rapidly changed while the fishing lure is attached to a fishing leader passing therethrough. However, the present invention should not be considered as limited to the forms shown which are to be considered illustrative rather than restrictive.

I claim:

1. A fishing lure having a changeable skirt comprising:
    a head having a bore therethrough and a chamber formed therein;
    an attaching member having a bore therethrough attached to said head;
    a first skirt having a slotted skirt sleeve at one end thereof and a plurality of stringers extending therefrom;
    a first slotted skirt supporting ring shaped for attaching said skirt slotted sleeve thereto;
    a first slotted clamp for attaching to said first slotted skirt supporting ring to hold said first skirt thereto; and
    a locking member having a bore therethrough and including a locking end for engaging said attaching member for attaching said first skirt ring and clamped first skirt to said head; whereby the lure first skirt can be changed while said lure is attached to a fishing line by passing a fishing line through slots in said first skirt sleeve and first skirt supporting ring and clamp and then locking said first skirt, skirt supporting ring and clamp to said head by removably locking said locking member to said head.

2. The fishing lure in accordance with claim 1 in which said head has front end and rear end portions and said front end portion has a plurality of apertures therein opening into said head chamber.

3. The fishing lure in accordance with claim 2 in which said head has a fishing line sleeve passing therethrough.

4. The fishing lure in accordance with claim 3 in which said head chamber has a plurality of noise and air mincing members therein for making noise and breaking up air bubbles when water passes through said apertures in said head front end portion.

5. The fishing lure in accordance with claim 4 in which said noise members are generally spherically shaped members.

6. The fishing lure in accordance with claim 2 in which said head rear end portion has a plurality of apertures opening into said head chamber for water entering into said head front end portion to egress from said head chamber.

7. The fishing lure in accordance with claim 1 including a second skirt having a slotted sleeve therein and a second slotted skirt ring and a second slotted clamp so as to removably attach a pair of skirts to said head with said second skirt sized for attachment inside said first skirt.

8. A method of changing a skirt on a fishing lure comprising the steps of:
    selecting a fishing lure having a head having a bore therethrough and a chamber formed therein, an attaching member attached to said head and a skirt having a slotted skirt sleeve at one end thereof and a plurality of stringers extending therefrom, a slotted skirt supporting ring shaped for attaching said skirt slotted sleeve thereto, a slotted clamp for attaching to said slotted skirt supporting ring to hold said skirt thereto, and a locking member having a bore therethrough and including a locking end for engaging said attaching member for attaching said skirt ring and clamped skirt to said head;

disengaging said locking member from said attaching member;

removing said slotted clamp from said skirt ring to loosen said skirt;

removing said skirt from said fishing lure by sliding said skirt slotted skirt sleeve slot past a fishing line connected to said fishing lure;

selecting a replacement skirt having a slotted skirt sleeve for attachment to said fishing lure;

sliding said selected replacement sleeve over the fishing line and onto said slotted skirt supporting ring and clamping thereto with said slotted clamp; and connecting said locking member to said head and attaching member to lock said replacement skirt to said lure, whereby said lure skirt can be changed while the lure is attached to said fishing line.

* * * * *